Patented Apr. 30, 1929.

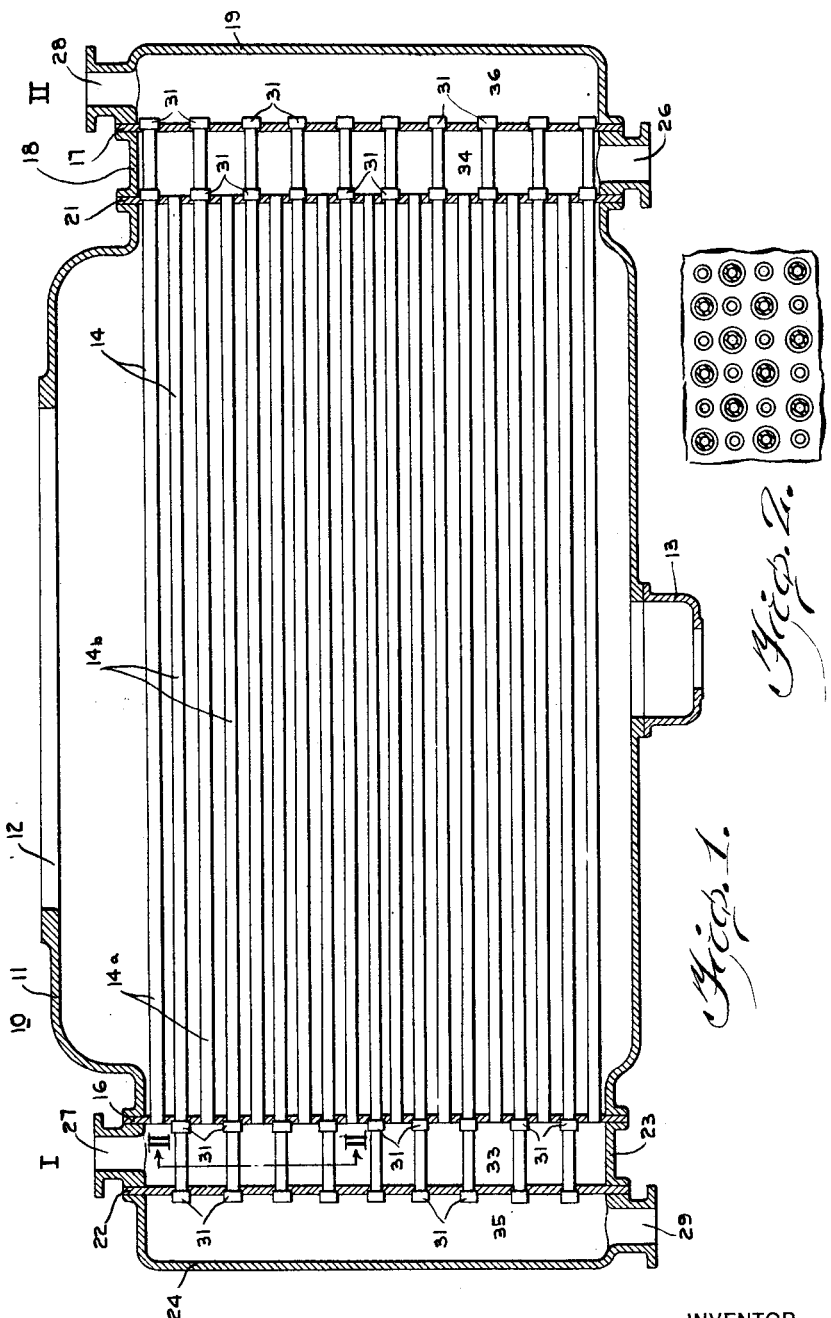

1,710,712

UNITED STATES PATENT OFFICE.

ANDREW B. REAVIS, OF SWARTHMORE, PENNSYLVANIA, ASSIGNOR TO WESTINGHOUSE ELECTRIC & MANUFACTURING COMPANY, A CORPORATION OF PENNSYLVANIA.

CONDENSER.

Application filed October 18, 1927. Serial No. 226,978.

My invention relates to tubular heat exchangers, and more particularly to surface condensers and the like, and it has for an object, to improve the efficiency of apparatus of this character.

In apparatus of the type described, an exchange of heat between fluids is effected by passing fluid through heat transfer tubes about which a fluid having a different temperature is circulated. In a condenser, for example, cooling media is passed through the tubes for condensing steam which is admitted to the space about the tubes, but the maximum heat transfer is not obtained due to the gradual rise in temperature of the cooling media as it is passed through the tubes.

This condition results in giving the portion of the tubes adjacent the cooling media inlet a greater condensing capacity, due to the lower temperature, than the portion of the tubes adjacent their outlet ends have where the temperature of the cooling media is somewhat higher. As the steam admitted to the nest is of substantially a uniform temperature, there is a greater temperature difference near the cooling media inlet and consequently this portion of the nest can condense more steam than portions more remote therefrom.

In order to take advantage of these conditions, various arrangements have been proposed for producing an unequal distribution of steam longitudinally, while others have been proposed for causing first pass cooling media to pass in opposite directions through the nest. Apparatus constructed in accordance with the latter of the above plans is the more closely related to my invention.

In apparatus heretofore devised for circulating first-pass cooling media in opposite directions, separate portions of the nest have been devoted solely to passing the cooling media in one direction or the other, with the result that within these respective portions the conditions are still as unfavorable as ever, although the conditions, throughout the nest as a whole, are somewhat improved.

More particularly, therefore, an object of my invention is to provide a tubular heat exchanger which shall embody means for passing circulating media of substantially the same temperature through the same portions of the nest and in opposite directions.

This and other objects are effected by my invention, as will be apparent from the following description and claims taken in connection with the accompanying drawings, forming a part of this application, in which:

Fig. 1 is a sectional elevation of a surface condenser; and

Fig. 2 is a partial transverse section on the line II—II of Fig. 1.

According to my invention means are provided for passing circulating media in opposite directions through adjacent tubes of the nest. In this way it is possible to produce a substantially uniform temperature throughout all portions of the nest and thus, the various portions are equally effective.

Referring now to the drawings for a better understanding of my invention, I show a surface condenser indicated generally at 10, and comprising a shell 11, having an inlet 12 for gaseous media, such as condensable vapors and the like, and a hotwell 13 is provided on the lower portion of the shell in a manner well understood in the art. Disposed within the shell 11 is a nest of heat transfer tubes 14.

In order to provide for producing a substantially uniform temperature, longitudinally of the nest of tubes, I provide means for passing circulating media, through adjacent tubes, throughout the nest in opposite directions. In the form of my invention shown, I accomplish this by providing separate sets of tube sheets for different groups of tubes, some of the tubes, 14ª for example, being rigidly secured to the tube sheet 16, which is connected in any suitable manner to one end of the shell, and the other ends of these tubes are loosely packed in any approved manner in the tube sheet 21 and also in the tube sheet 17, and the latter tube sheet is secured between the annular casing member 18 and the box-like member 19. The remaining tubes, 14ᵇ for example, of the nest are rigidly secured, as by rolling or the like, in the tube sheet 21, which is secured between the end of the shell and the annular casing member 18, and the other ends of these tubes are loosely packed in the tube sheet 16 and also the tube sheet 22 and the latter is secured between the annular casing member 23 and the box-like member 24. The annular casing members 18 and 23 are secured against the innermost tube sheets 21 and 16 and are suitably fastened to the respective ends of the shell. These annular casing members are provided with connections 26 and 27, respectively, and the box-like members 19 and 24 are provided with similar connections 28 and 29.

Suitable packing 31, may be provided for the tubes, which are not rigidly secured in the tube sheets, at the point at which these tubes pass therethrough. Substantially equal numbers of the tubes are secured in the respective sets of tube sheets. From Fig. 2 it will be clear that every other tube of each transverse horizontal row, as well as every other tube of each transverse vertical row will be connected to one circulating system and will be arranged, for example, to receive circulating medium through the inlet water box 34 and to discharge the same through the discharge water box 35, while the remaining tubes will receive circulating medium through the inlet water box 33 and will discharge the same through the discharge water box 36.

To facilitate a ready understanding of the apparatus and its operation, in the drawing, one end of the apparatus is designated "I" while the other end of the apparatus is designated "II". The first and second inner tube plates 16 and 21 are arranged contiguously to the ends of the shell and the first and second outer tube plates 22 and 17 are arranged adjacent to the inner tube plates 16 and 21 respectively. The elements 23, 24, 18 and 19 cooperate with the first and second inner and outer tube plates to provide first and second inner water boxes 33 and 34 and first and second outer water boxes 35 and 36. Each of the tubes 14$^a$ of the first group is connected to the first and second inner tube plates 16 and 21 and to the second outer tube plate 17 in order to afford communication between the first inner water box or chamber 33 and the second outer water box or chamber 36. Each of the tubes 14$^b$ of the second group is connected to the first and second inner tube plates 16 and 21 and to the first outer tube plate 22 in order to afford communication between the first outer chamber or box 35 and the second inner chamber or box 34. Cooling medium or water may enter the boxes or chambers 33 and 34 and be discharged from the chambers 35 and 36; or it may enter the chambers 35 and 36 and be discharged from the chambers 33 and 34. Cooling medium should be so admitted and discharged from the chambers or boxes that flow will take place in a direction in the group of tubes 14$^a$ opposite to that taking place in the group of tubes 14$^b$ intermingled with respect to the first group. Hence, it will be seen, that the decrease in cooling capacity of the first group of tubes from the inlet to the outlet ends thereof is compensated for by increasing cooling capacity of the other group of tubes considered in the same direction. By having the tubes of the groups intermingled and by having cooling medium pass therethrough in opposite directions, there results a substantially uniform capacity for heat exchange throughout the nest, thereby rendering every portion of the nest more fully and uniformly effective.

While I have shown my invention embodied in a surface condenser, it will be obvious that it may also be embodied in various types of tubular heat exchangers, such as condenser type heaters, oil coolers and the like.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:—

1. In apparatus of the character described, the combination of a shell, first and second inner tube plates arranged contiguously to the ends of the shell, first and second outer tube plates arranged adjacent to the first and second inner tube plates, means cooperating with the first and second inner and outer tube plates to provide first and second inner and outer chambers, a first group of tubes connected to the first and second inner and to the second outer tube plates to afford communication between the first inner and the second outer chambers, and a second group of tubes connected to the first and second inner and to the first outer tube plates to afford communication between the first outer and the second inner chambers.

2. In heat exchange apparatus, the combination of a shell having an inlet for media to be cooled and an outlet for cooled media, first and second inner tube plates arranged contiguously to the ends of the shell, first and second outer tube plates, means cooperating with the tube plates to provide first and second inner and outer chambers for cooling medium, a first group of tubes connected to the first and second inner and the second outer tube plates to afford communication between the first inner and the second outer chambers, and a second group of tubes intermingled with respect to the first group of tubes and connected to the first and second inner and to the first outer tube plates to afford communication between the first outer and the second inner chambers.

In testimony whereof, I have hereunto subscribed my name this 7th day of October, 1927.

ANDREW B. REAVIS.